US008830356B2

(12) United States Patent
Balannik et al.

(10) Patent No.: US 8,830,356 B2
(45) Date of Patent: Sep. 9, 2014

(54) METHOD AND DEVICE FOR COMPOSITE IMAGE CREATION

(75) Inventors: Vadim Balannik, Arlington Heights, IL (US); Patrick Dell Ellis, Lake in the Hills, IL (US)

(73) Assignee: BlackBerry Limited, Waterloo (CA)

( * ) Notice: Subject to any disclaimer, the term of this patent is extended or adjusted under 35 U.S.C. 154(b) by 10 days.

(21) Appl. No.: 13/477,656

(22) Filed: May 22, 2012

(65) Prior Publication Data
US 2013/0314561 A1 Nov. 28, 2013

(51) Int. Cl.
*H04N 5/262* (2006.01)

(52) U.S. Cl.
USPC ........................................ 348/239; 348/218.1

(58) Field of Classification Search
CPC .... H04N 5/272; H04N 2101/00; H04N 5/772
USPC ................... 348/218.1, 222.1, 239
See application file for complete search history.

(56) References Cited

U.S. PATENT DOCUMENTS

| 7,365,794 | B2 * | 4/2008 | Yasui | 348/374 |
|---|---|---|---|---|
| 7,440,013 | B2 * | 10/2008 | Funakura | 348/239 |
| 2008/0239061 | A1 * | 10/2008 | Cok et al. | 348/14.02 |
| 2009/0008554 | A1 | 1/2009 | Weir et al. | |
| 2010/0238325 | A1 | 9/2010 | Hoshino et al. | |
| 2010/0304788 | A1 * | 12/2010 | Mun | 348/14.01 |

FOREIGN PATENT DOCUMENTS

| EP | 1507386 A1 | 2/2005 |
|---|---|---|
| EP | 1560421 A1 | 8/2005 |

OTHER PUBLICATIONS

Extended European Search Report from related European Patent Application No. 12168952.5 dated Aug. 29, 2012; 6 pages.

* cited by examiner

*Primary Examiner* — Gevell Selby
(74) *Attorney, Agent, or Firm* — Fitch, Even, Tabin & Flannery LLP

(57) ABSTRACT

The present disclosure provides a method and device for composite image creation. Images from multiple lenses, such as a front camera and rear camera of a host electronic device, are combined to create a composite image. The images may be modified before combining using location, orientation and/or proximity information associated with the images.

20 Claims, 3 Drawing Sheets

METHOD AND DEVICE FOR COMPOSITE IMAGE CREATION

TECHNICAL FIELD

The present disclosure relates to digital cameras, and more particularly to a method and device for composite image creation.

BACKGROUND

Digital cameras, including digital cameras built into smartphones and other multipurpose portable electronic devices, often include advance image creation modes which can be used to add image effects or combine multiple images together. While somewhat useful, there remains a need for improved image capture methods and devices.

DETAILED DESCRIPTION

Figure 1:
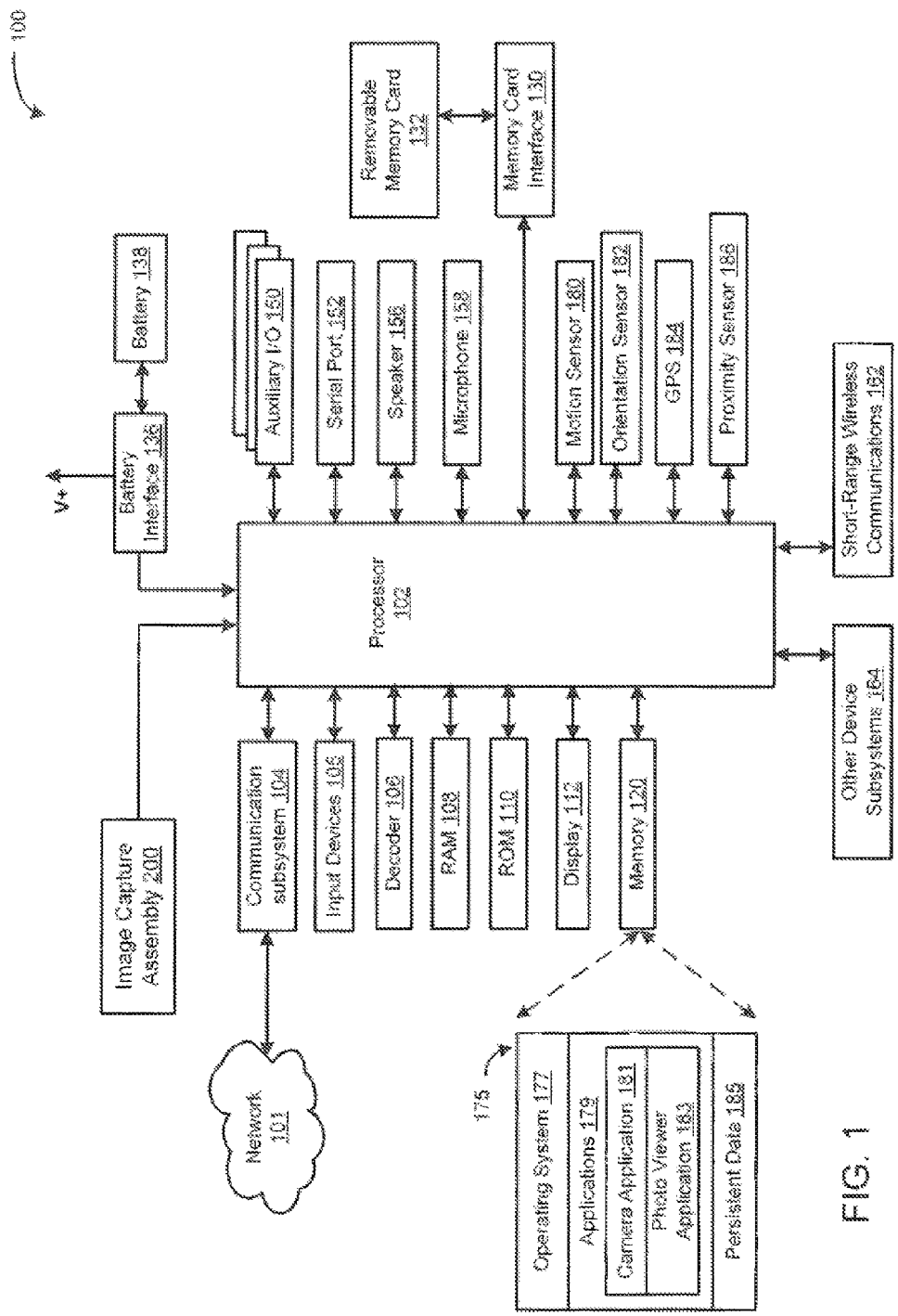
FIG. 1 is a block diagram illustrating a portable electronic device suitable for carrying out example embodiments of the present disclosure.

Reference will now be made to the accompanying drawings which show example embodiments of the present disclosure. For simplicity and clarity of illustration, reference numerals may be repeated among the Figures to indicate corresponding or analogous elements. Numerous details are set forth to provide an understanding of the example embodiments described herein. The example embodiments may be practised without some of these details. In other instances, well-known methods, procedures, and components have not been described in detail to avoid obscuring the example embodiments described. The description is not to be considered as limited to the scope of the example embodiments described herein.

Any reference to direction or orientation stated herein is for convenience and is not intended to be limiting unless explicitly stated herein. Any directional references in relation to the graphical user interface (GUI) are relative to the screen orientation of the GUI rather than a fixed point or reference on the host electronic device. The term "user interface" is sometimes used herein to refer to the GUI for convenience. For the purpose of the present disclosure, the terms device orientation and device position are treated equivalently.

The present disclosure provides a methods and devices for composite image creation. Images from multiple lenses, such as front and rear cameras of a host electronic device, are combined to create a composite image. The images may be modified before combining using location, orientation and/or proximity information associated with the images.

In accordance with one example embodiment, there is provided a method for composite image creation on a portable electronic device. The method includes: storing a first image captured by a first image sensor of the portable electronic device; storing a second image captured by a second image sensor of the portable electronic device; extracting image elements from the first image; and combining the extracted image elements with the second image.

In accordance with yet a further example embodiment, there is provided an electronic device, comprising: a processor; a first image sensor coupled to the processor; a second image sensor coupled to the processor; wherein the processor is configured for performing the method(s) set forth herein.

In accordance with yet a further embodiment of the present disclosure, there is provided a computer program product comprising a computer readable medium having stored thereon computer program instructions for implementing a method on an electronic device, the computer executable instructions comprising instructions for performing the method(s) set forth herein.

Reference is first made to FIG. 1 which illustrates a portable electronic device 100 (referred to hereinafter as merely electronic device 100 for convenience) in which example embodiments described in the present disclosure can be applied. The electronic device 100 described below has wireless communication capabilities; however, it is contemplated that the teachings of the present disclosure may be applied to devices without wireless communication capabilities. Examples of the electronic device 100 include, but are not limited to, a mobile phone, smartphone or superphone, tablet computer, notebook computer (also known as a laptop, netbook or ultrabook computer depending on the device capabilities), wireless organizer, personal digital assistant (PDA), electronic gaming device, and special purpose digital camera (which may be capable of both still image and video image capture).

The electronic device 100 includes a rigid case (not shown) housing the electronic components of the electronic device 100. The electronic components of the electronic device 100 are mounted on a printed circuit board (not shown). The electronic device 100 includes a controller comprising at least one processor 102 (such as a microprocessor) which controls the overall operation of the electronic device 100. Communication functions, including data and voice communications, are performed through a communication subsystem 104. Data received by the electronic device 100 may be decompressed and decrypted by a decoder 106. The communication subsystem 104 receives messages from and sends messages to a wireless network 101. The wireless network 101 may be any suitable type of wireless network.

The processor 102 interacts with other components, such as one or more input devices 105, Random Access Memory (RAM) 108, Read Only Memory (ROM) 110, a display 112 such as a colour liquid crystal display (LCD), persistent (non-volatile) memory 120 which may be flash erasable programmable read only memory (EPROM) memory ("flash memory") or any other suitable form of memory, an image capture assembly 200, a motion sensor 180 which enables to processor 102 to determine whether the electronic device 100 is in motion and the nature of any sensed motion at any appropriate time, e.g., when an image is captured, an orientation sensor 182 which enables the processor 102 to determine which direction the electronic device 100 is pointed at any appropriate time, e.g., when an image is captured, global positioning system (GPS) device 184 which enables the processor 102 to determine GPS coordinates (i.e., location) of the electronic device 100 at any appropriate time, e.g., when an image is captured, proximity sensor 186 which enables the processor 102 to determine the distance between the electronic device 100 and the object that is photographed using the image capture assembly 200, auxiliary input/output (I/O) subsystems 150, data port 152 such as serial data port (e.g., Universal Serial Bus (USB) data port), speaker 156, microphone 158, short-range communication subsystem 162, and other device subsystems generally designated as 164. The components of the electronic device 100 are coupled via a communications bus (not shown) which provides a communication path between the various components.

The display 112 typically includes a display area in which information may be displayed and a non-display area extending around the periphery of the display area. Information is not displayed in the non-display area. The non-display area may be utilized to accommodate, for example, electronic traces or electrical connections, adhesives or other sealants, and/or protective coatings around the edges of the display area.

The display 112 may be provided as part of a touch-sensitive display which provides an input device 105. The display 112 which together with a touch-sensitive overlay (not shown) operably coupled to an electronic controller (not shown) comprise the touch-sensitive display. The touch-sensitive display is typically a capacitive touch-sensitive display which includes a capacitive touch-sensitive overlay may be any other suitable touch-sensitive display, such as a resistive, infrared, surface acoustic wave (SAW) touch-sensitive display, strain gauge, optical imaging, dispersive signal technology, acoustic pulse recognition, and so forth, as known in the art. The overlay of the touch-sensitive display may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

User-interaction with the GUI is performed through the input devices 105. Information, such as text, characters, symbols, images, icons, and other items are rendered and displayed on the display 112 via the processor 102. The processor 102 may interact with the orientation sensor 182 to detect direction of gravitational forces or gravity-induced reaction forces so as to determine, for example, the orientation of the electronic device 100 in order to determine a screen orientation for the GUI.

The input devices 105 may include a keyboard, control buttons such as a power toggle (on/off) button (not shown), a camera button (not shown) for enabling a camera mode, a capture button (not shown) for enabling an image capture sequence when in the camera mode, one or more zoom buttons (not shown) for enabling a selection of a zoom setting when in the camera mode, and a navigation device (not shown) for navigating through stored data, such as digital images, menu choices and the like which are displayed on the display 112. When the display 112 is provided as part of a touch-sensitive display, the capture button, zoom button and other camera controls may be provided by onscreen user interface elements displayed on the display 112 instead of, or in addition to, physical interface components. The keyboard may be provided instead of, or in addition to, a touch-sensitive display depending on the embodiment. At least some of the control buttons may be multi-purpose buttons rather than special purpose or dedicated buttons.

The electronic device 100 also includes a memory card interface 130 for receiving a removable memory card 132 comprising persistent memory, such as flash memory. A removable memory card 132 can be inserted in or coupled to the memory card interface 130 for storing and reading data by the processor 102 including, but not limited to still images and optionally video images captured the image capture assembly 200. Other types of user data may also be stored on the removable memory card 132. Other types of removable digital image storage media, such as magnetic hard drives, magnetic tape, or optical disks, may be used in addition to, or instead of, the removable memory card 132.

The processor 102 operates under stored program control and executes software modules 175 stored in memory, for example, in the persistent memory 120. As illustrated in FIG. 1, the software modules 175 comprise operating system software 177 and software applications 179. The software applications 179 include a camera application 181 and photo viewer application 183. The camera application 181 contains the logic for operating the image capture assembly 200 and capturing still images and optionally video images from the image capture assembly 200 and storing the still images and video images in the persistent memory 120. The photo viewer application 183 contains logic for displaying data (i.e., still images and optionally video images) from the persistent memory 120 and data from the image capture assembly 200 on the display 112. Persistent data 185, such as user data, can also be stored in the persistent memory 120. The persistent data 185 may include digital media files stored in the electronic device 100 such as still images and/or video images captured the image capture assembly 200, or other still images and/or video images transferred, downloaded or otherwise stored on the persistent memory 120.

The software modules 175 or parts thereof may be temporarily loaded into volatile memory such as the RAM 108. The RAM 108 is used for storing runtime data variables and other types of data or information. Although specific functions are described for various types of memory, this is merely one example, and a different assignment of functions to types of memory could also be used.

Still images and optionally video images captured the image capture assembly 200 are stored in persistent memory after. The persistent memory may be one or any combination of the internal persistent memory 120, the removable memory card 132 or remote persistent storage. The remote persistent storage may be a cloud based resource, such as a remote content server, accessible by the wireless network 101 or possibly via a wireline (e.g., via the data port 152) or short-range wireless connection (e.g., via the short-range communication subsystem 162) to a host computer having wireline access to the cloud based resource. The location at which captured still images and optionally video images is stored is typically a configurable setting which may be set by a user either in advance or at the time of capture.

The camera application 181 and/or photo viewer application 183 can access the remote persistent storage and optionally cloud based applications through the wireless network 101 or possibly via a wireline or short-range wireless connection to a host computer having wireline access to the cloud based resource. The use of cloud based or other remote persistent storage allows access to still images and optionally video images captured the image capture assembly 200 from nearly any computer or portable electronic device having access to the Internet.

The electronic device 100 also includes a battery 138 as a power source, which is typically one or more rechargeable batteries that may be charged, for example, through charging circuitry coupled to a battery interface such as the serial data port 152. The battery 138 provides electrical power to at least some of the electrical circuitry in the electronic device 100, and the battery interface 136 provides a mechanical and electrical connection for the battery 138. The battery interface 136 is coupled to a regulator (not shown) which provides power V+ to the circuitry of the electronic device 100.

A received signal, such as a text message, an e-mail message, or web page download, is processed by the communication subsystem 104 and input to the processor 102. The processor 102 processes the received signal for output to the display 112 and/or to the auxiliary I/O subsystem 150. A subscriber may generate data items, for example e-mail messages, which may be transmitted over the wireless network 101 through the communication subsystem 104, for example.

The motion sensor 180 may comprise an accelerometer (such as a three-axis accelerometer) or other suitable motion sensor. The orientation sensor 182 may comprise an accelerometer (such as a three-axis accelerometer), electronic compass, gyroscope, or a combination thereof. Other suitable orientation sensors could be used instead of, or in addition to, the accelerometer, electronic compass and gyroscope. The motion sensor 180 and orientation sensor 182, or parts thereof, may be combined or shared, for example, within an integrated component. The processor 102, or controller (not shown) of a three-axis accelerometer, can convert acceleration measurements into device orientations.

The proximity sensor 186 may comprise a sensor that transmits a field or signals (such as electromagnetic) to detect the presence of nearby objects (i.e. the sensor's target). The maximum distance that the proximity sensor 186 can detect is may be predetermined or adjustable. The processor 102 can utilize this information to determine the distance between the electronic device 100 and the target object to be captured in an image.

The electronic device 100 may connect to a host personal computer (not shown) via the serial data port 152 or short-range communication subsystem 162 communicating over a suitable interconnection, such as a USB connection, Firewire™ connection, Bluetooth™ connection or the like.

Figure 2:
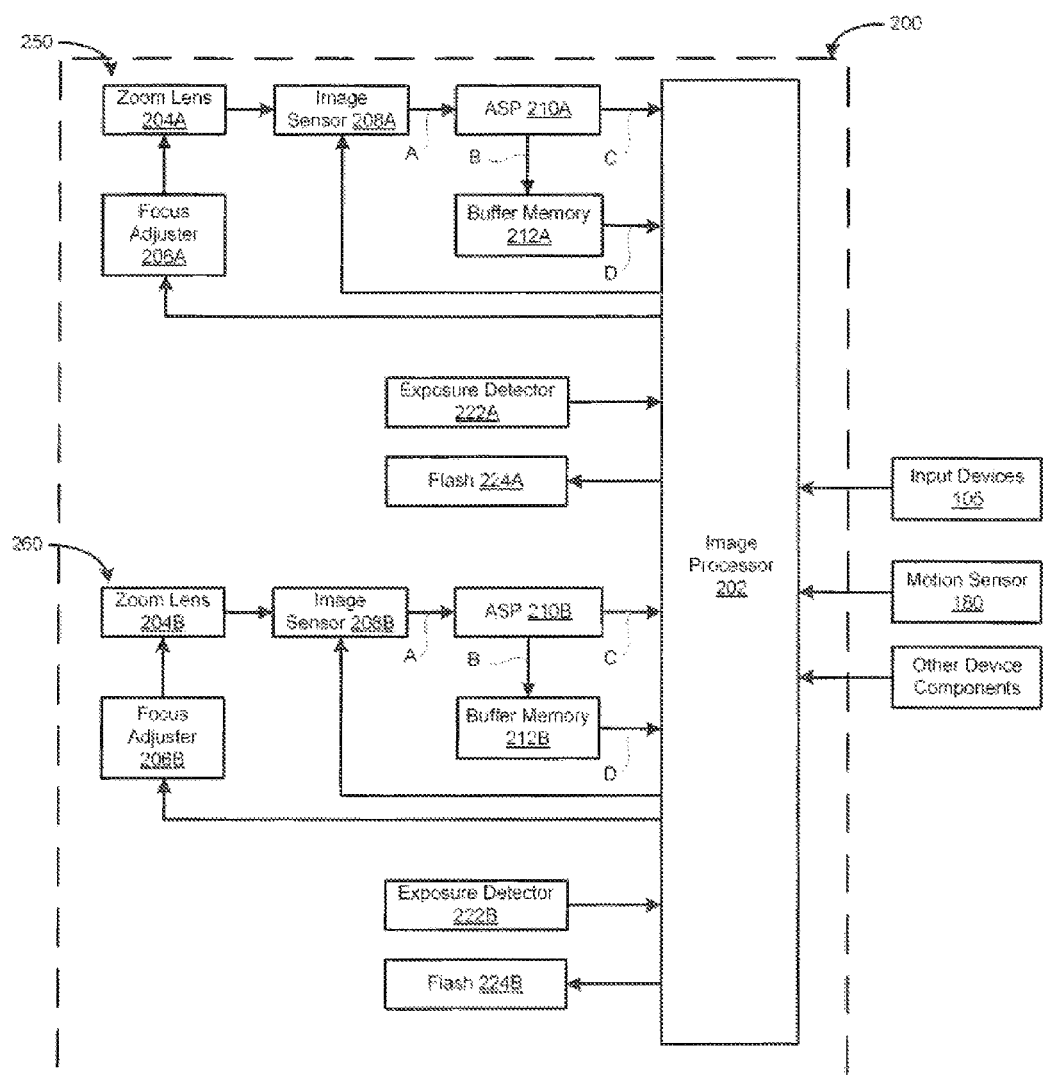
FIG. 2 is a block diagram illustrating an image capture assembly of the portable electronic device of FIG. 1.

Referring now to FIG. 2, the image capture assembly 200 of the electronic device 100 will be described in more detail. The image capture assembly 200 includes an image processor 202 which performs various image processing functions described below. The image processor 202 is typically a programmable image processor but could be, for example, a hard-wired custom integrated circuit (IC) processor, a general purpose microprocessor, or a combination of hard-wired custom IC and programmable processors. When the image capture assembly 200 is part of a multipurpose portable electronic device such as a mobile phone, smartphone or superphone, at least some of the functions of the image capture assembly 200 may be performed by the main processor 102 of the host electronic device 100. It is contemplated that all of the functions performed by the image processor 202 could be performed by the main processor 102, in which case the image processor 202 can be omitted. Furthermore, the image capture assembly 200 has access to various components of the host electronic device 100, and can receive inputs from and send outputs to various components of the host electronic device 100, input such as the input devices 105, motion sensor 180, orientation sensor 182, GPS 184, RAM 108, persistent memory 120 and the like.

The image capture assembly 200 includes two imaging stages A and B, corresponding to a front camera 250 and a rear camera 260 with zoom lenses 204A and 204B, respectively. The front camera 250 is located on a front side of a housing (not shown) of the electronic device 100 in which the display 112 is located, and the rear camera 260 is located on a rear side of the housing opposite to the front side.

The first zoom lens 204A includes a mechanical assembly of lens elements which is controlled by a first focus adjuster 206A, such as zoom and focus motors (e.g., servo motors), which adjust the focal length and focus distance of the first zoom lens 204A. The second zoom lens 204B is controlled by a second focus adjuster 206B, such as zoom and focus motors (e.g., servo motors), which adjust the focal length and focus distance of the second zoom lens 204B. The focus adjusters 206A, 206B are coupled to the image processor 202 which sends zoom and focus signals to the adjusters 206A, 206B during zoom and focus operations.

The zoom lenses 204A and 204B may be the same or different. In other embodiments, one or both of the zoom lenses 204A, 204B could be replaced with a fixed focal length lens (also known as a "prime" lens) in which case the focus adjuster 206 merely adjusts the focus distance of the lens. Digital zoom may be provided by digital image processing performed by the processor 202 of the image capture assembly 200 or processor 102 (rather than optical zoom provided by the zoom lenses 204A, 204B). In other embodiments, the shutter assembly could be omitted in favour of an electronic shutter.

The focal length of the zoom lenses 204A, 204B is expressed by an f-number (sometimes called focal ratio, f-ratio, f-stop, or relative aperture) which is a measure of the diameter of the aperture of the zoom lenses 204A, 204B. In simple terms, the f-number is the focal length divided by the "effective" aperture diameter. The f-number is a dimensionless number that is a quantitative measure of lens "speed".

The zoom lenses 204A, 204B have a variable aperture the size of which is expressed by an f-number (sometimes called focal ratio, f-ratio, f-stop, or relative aperture) which is a measure of the diameter of the aperture of the zoom lenses 204A, 204B. The f-number is the focal length divided by the "effective" aperture diameter. The f-number is a dimensionless number that is a quantitative measure of lens "speed".

The first zoom lens 204A provides an image to a first image sensor 208A. The second zoom lens 204B provides an image to a second image sensor 208B. The image sensors 208A and 208B may be the same or different. The image sensors 208A, 208B may have a number of aspect ratios, such as a 4:3 and 16:9 image aspect ratios, and a number of image resolutions. In some embodiments, the image sensors 208A, 208B are charge-coupled devices (CCD) sensor; however, complementary metal-oxide semiconductor (CMOS) sensors or other suitable image sensors could be used. An adjustable aperture and shutter assembly (not shown) in the zoom lenses 204A, 204B is used to control the aperture size and the exposure time of the image sensors 208A, 208B.

The image processor 202 controls the image sensors 208A, 208B by supplying various control signals to the image sensors 208A, 208B. The image processor 202 also controls the focus adjusters 206A, 206B, exposure detectors 222A, 222B which determine the amount of available light, and flashes 224A, 224B which emit light to illuminate a scene being captured by the zoom lenses 204A, 204B. The input devices 105 provide user controls which can control the operation of the image capture assembly 200. The image processor 202 can use the input from the exposure detectors 222A, 222B to determine the exposure time required to capture an image using the image sensors 208A, 208B based on the amount of available light and other settings. The image processor 202 can activate the first flash 224A and/or second flash 224B to increase the amount of available light, for example, in response to the input from the exposure detector 222A or 222B.

An analog captured image signal A output from the image sensors 208A, 208B is amplified and converted to a digital captured image signal by first and second analog signal processors (ASP) 210A and 210B, respectively. The ASPs 210A, 210B each include an analog-to-digital (A/D) converter among other functional components. A digital captured image signal B output by the ASPs 210A, 2109 is temporarily stored in a first buffer memory 212A or second buffer memory 212B, respectively. The buffer memories 212A, 212B may be a Dynamic random-access memory (DRAM) buffer memory in some embodiments. While separate buffer memories 212A, 212B have been described, it is contemplated that a single, shared buffer memory may be used in other embodiments.

The image processor 202 produces focus signals which drive the focus adjusters 206A, 206B (e.g., zoom and focus motors) to adjust the focus of an image providing the image sensor output for the captured image signal, typically in response to the activation of the capture button. A passive autofocus system is typically provided by the electronic device 100. In the passive autofocus system, a digital captured image signal C output by the ASPs 210A, 210B is provided to the image processor 202 which performs autofocus calculations on the digital captured image signal C. Focus signals are sent to one of the focus adapters 206A, 206B to adjust the focus distance of a respective one of the zoom lenses 204A, 204B as necessary as a result of the output the autofocus calculations. The autofocus calculations are typically performed using either contrast detection or phase detection methods which rely on moving the zoom lenses 204A, 204B to make minor adjustments in the focus distance until a maximal (or optimal) contrast is obtained. The autofocus calculations assume that maximal (or optimal) contrast corresponds to maximal sharpness. The nature of the autofocus calculations is outside the scope of the present disclosure and will not be described in further detail herein. Autofocus methods and calculations suitable for use by the image processor 202 are well known in the art and will be readily known to the skilled person.

The image processor 202 may continuously produce focus signals thereby providing continuous autofocus when the image capture assembly 200 is in an active or ready-to-capture state (rather than an inactive state such as when displaying a full screen menu) such that the images being stored to the buffer memory 212 are focused images rather than performing autofocus operations in response to the activation of the capture button as mentioned previously.

In other embodiments, an active autofocus system could be used instead of the passive autofocus system described above. The active autofocus system may include an infrared (IR) emitter and IR sensor which determines a distance from the IR emitter to an object at the focus point using the time for reflected IR waves to return to the IR sensor and/or the intensity of the reflected IR waves. The focus adjusters 206A, 206B moves a respective one of the zoom lens 204A, 204B in accordance with the determined distance.

The digital captured image signal C may also be output to the display 112 to provide a preview image for one or both of the front camera 250 or rear camera 260. The digital captured image signal C may be used to provide a real-time or "live" preview in which a real-time image (or an approximation of an image) of the image captured with the first image sensor 208A and/or second image sensor 208B is displayed on the display 112 as a thumbnail image (e.g., reduced size/resolution version) of the captured image for graphical processing efficiency, or alternatively a dedicated electronic viewfinder device.

A digital captured image signal D provided by the buffer memories 212A, 212B is subsequently processed by the image processor 202 to produce a processed digital image file, which may contain a still digital image or a video image.

The image processor 202 may perform various other image processing functions, including colour interpolation and colour and tone correction to produce rendered image data, such as standard Red Green Blue (sRGB) image data. The rendered image data is then stored in the memory of the removable memory card 132 or persistent memory 120. In some embodiments, the rendered image data may be compressed before storing, for example, the rendered image data may be JPEG compressed and stored as a JPEG image file, which may be in the Exchangeable image file (Exit) format or other suitable format which preferably supports image metadata, such as one or more of a date/time the image was captured, f-number of the first zoom lens 204A and/or second zoom lens 204B at which the image was captured, GPS location and pointing direction when the image was captured and possibly other camera settings.

The processing performed by the image processor 202 is typically controlled by firmware stored in a firmware memory (not shown), which may be flash memory or any other suitable form of memory. The image processor 202 processes the digital input image from the buffer memories 212A and 212B, using RAM memory (such as RAM 108 of the host electronic device or possibly separate, dedicated RAM) to store intermediate results during processing.

While the components of the electronic device 100 are shown as separate blocks in FIGS. 1 and 2, the functions of various components may be combined in actual processing elements, circuits and the like. Furthermore, some of the functional blocks of FIGS. 1 and 2 may be separated into one or more sub blocks when implemented in actual processing elements, circuits and the like.

The present disclosure provides methods and devices for composite image creation. Images from multiple lenses, such as the front camera 250 and the rear camera 260, of the portable electronic device 100, are combined to create a composite image. A user typically uses a front camera 250 to capture an image of an object, such as a person or group of two or more persons. The front camera 250 may be used for "self-portraits" in which an image is captured of the user and optionally one more other persons. Advantageously, the front camera 250 allows the user see a preview image on the display 112 during composition of the image. The user typically uses a rear camera 260 to capture an image of a background of the composite image, such as a landscape, building or other scenery.

Figure 3:
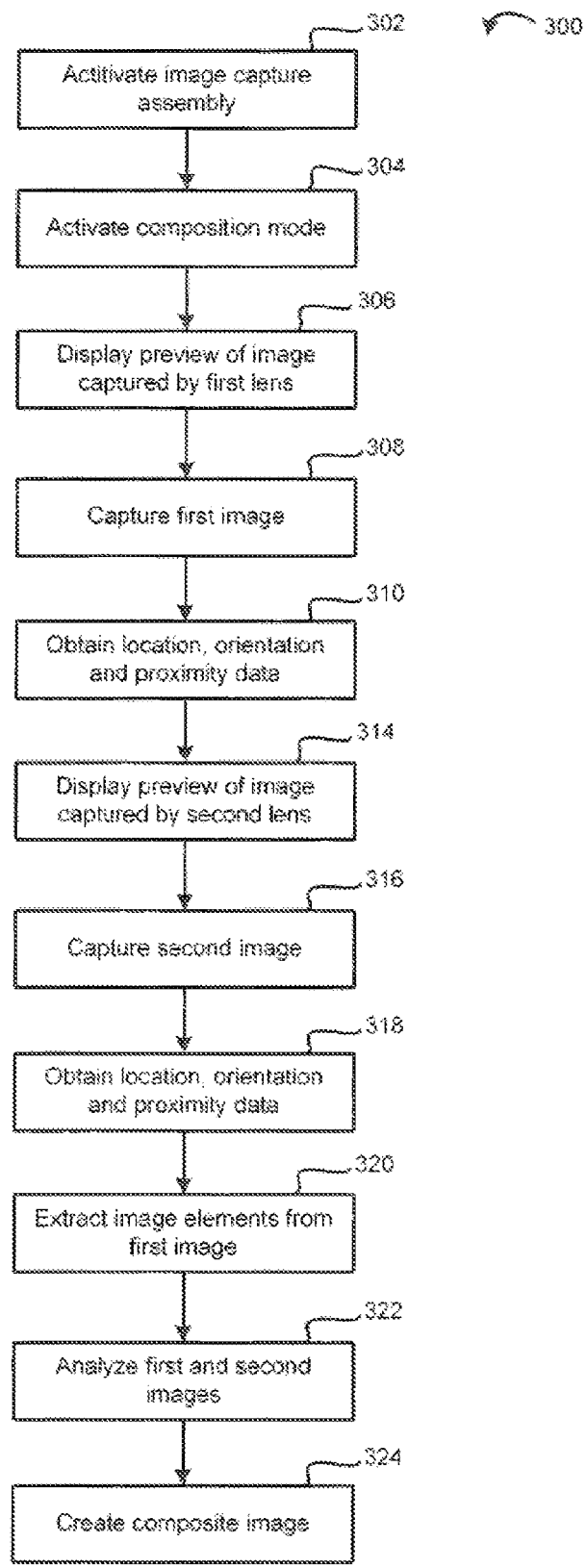
FIG. 3 is a flowchart of a method for composite image creation in a digital camera in accordance with one example embodiment of the present disclosure.

FIG. 3 is a flowchart of a method 300 for composite image creation in accordance with one example embodiment of the present disclosure. The method 300 may be carried out, at least in part, by firmware or software such as the camera application 181, executed by the processor 102 and/or image processor 202. Coding of software for carrying out such a method 300 is within the scope of a person of ordinary skill in the art provided the present disclosure. The method 300 may contain additional or fewer processes than shown and/or described, and may be performed in a different order. Computer-readable code executable by at least one processor 102 and/or image processor 202 to perform the method 300 may be stored in a computer-readable medium such as the persistent memory 120.

In the example method 300, a first image is captured using the front camera 250 and a second image is captured using the rear camera 260. In another embodiment, the first image may be captured using the rear camera 260 and the second image may be captured using the front camera 250. However, in this embodiment, extraction of image elements (step 320 described below) will be performed on the second image, that is the image captured using the front camera 250.

At 302, the image capture assembly 200 is activated, for example, by engaging a camera mode of the electronic device 100. The camera mode can be activated by a camera button or a corresponding menu option displayed on the display 112.

At 304, a composite mode of the image capture assembly 200 is activated, for example by a menu option displayed on the display 112. In some embodiments, the electronic device 100 may prompt a user to choose whether to enter a composition mode after a first image is captured by either the front camera 250 or the rear camera 260 in step 308.

At 306, the image sensor 208A of the front camera 250 captures images which are output to the display 112 to provide an image preview mode which enables the user to compose the image of themselves and/or other people to be captured based on a real-time preview image. The digital captured image signal C provides captured images for preview on the display 112.

At 308, the capture button is activated and the image currently being displayed in the real-time preview image is selected for "permanent" capture and storage in persistent memory. In another embodiment, the first image captured is stored only in temporarily in memory. In other embodiments, no preview image is provided and the step 308 is omitted.

As part of selecting the captured image, the image processor 202 selects the image from the buffer memory 212 which corresponds to the real-time image displayed on the display 112 when the capture button was activated. The first image includes a subject in the form of one or more objects, which may be a person or group of two or more persons as described above, or other object(s).

At 310, the GPS 184 and orientation sensor 182 sense the position coordinates and the orientation of the front camera 250 when the first image was captured, and stores the GPS location data and orientation data temporarily in memory, for example, in RAM 108. Similarly, the proximity sensor 186 senses the distance between the front camera 250 and one or more objects captured in the first image and stores the proximity data temporarily in memory, for example, in RAM 108. While shown as a separate functional step, the GPS 184, orientation sensor 182 and the proximity sensor 186 sense location, orientation and proximity, respectively, during the image capture of 308. This information is utilized at 316 when the processor 102, or image processor 202, combines the first image and a second image, as described below.

At 314, image sensor 208B of the rear camera 260 captures images which are output to the display 112 to provide an image preview mode which enables the user to compose the image to be captured based on a real-time preview image. The digital captured image signal C provides captured images for preview on the display 112.

At 316, the capture button is activated and the image currently being displayed in the real-time preview image is selected for "permanent" capture and storage in persistent memory. In another embodiment, the first image captured is stored temporarily in memory, for example, in RAM 108. In other embodiments, no preview image is provided and the step 314 is omitted.

As part of selecting the captured image, the image processor 202 selects the image from the buffer memory 212 which corresponds to the real-time image displayed on the display 112 when the capture button was activated. The second image includes a background such as a landscape, building or other scenery. The background of the second image generally corresponds to the background image elements of the first image.

At 318, the GPS 184 and orientation sensor 182 sense the position coordinates and the orientation of the rear camera 260 when the second image was captured, and stores the GPS data and orientation data temporarily in memory, for example, in RAM 108. Similarly, the proximity sensor 186 senses the distance between the rear camera 260 and the object captured in the second image (i.e. the background) and stores the proximity data temporarily in memory, for example, in RAM 108. While shown as a separate functional step, the GPS 184, orientation sensor 182 and the proximity sensor 186 sense location, orientation and proximity respectively, during the image capture of 316.

At 320, the electronic device 100, via the processor 102 and/or image processor 202, analyzes the GPS location information, the orientation information and the proximity information for the first image and the second image. The electronic device 100 compensates for notable variances in the position and orientation of the front and rear cameras 250, 260 when the first image and second images were captured. A notable variance is a variance which exceeds a threshold for location, orientation or proximity, respectively. The notable variances for location, orientation and proximity may be configurable. The electronic device 100 modifies the first image and/or second image when a notable variance in one or more of location, orientation or proximity is determined. The first image and/or second image is modified so that modified images reflect a common location, orientation and/or proximity, i.e. so that modified images approximate images taken at the location and/or orientation of the front and rear cameras 250 and/or the same proximity to the object(s) in the first image or second image.

In one embodiment, the electronic device 100 may use the GPS location information and the orientation information to align the first image with the second image, taking into account the possible differences in GPS and orientation location values between the two images.

The electronic device 100 may utilize the proximity of the front camera 250 to the object of the first image and the proximity of the rear camera 260 to the object of the second image to modify the first image so that the modified first image reflects an image captured with the same proximity between the lens 204B and the subject of the second image, (i.e. background). Alternatively, the electronic device 100 may modify the second image so that the modified second image reflects an image captured with the same proximity between the lens 204A and the subject of the first image (i.e., one or more persons or other objects).

The location information, orientation information and/or proximity information may be used to change a size and/or perspective of the first or second image. A transformation vector may be determined and applied to change the perspective of the first image, or second image. In some embodiments, the first image may be reduced in size by a percentage of the original first image (e.g., 50% smaller than original size). In this way, the objects in the first image will be proportional to the object (e.g., background) of the second image when the images are combined.

At 322, one or more image elements which correspond to the one or more objects in the first image are identified and extracted from the first image. The first image from which image elements are identified and extracted are may be the original or modified image, depending on the result of 320. The identification and extraction of the one or more image elements is performed in accordance with image processing techniques known to a skilled person. For example, the electronic device 100 may determine the image elements that correspond to an object based on image characteristics such as, but not limited to, contrast and/or colour changes. The image characteristics are analyzed to locate shapes within the first image and the located shapes within the first image are compared to predetermined criteria to identify the located shapes. The predetermined criteria may be, but is not limited to, known shapes or profiles of known shapes. One or more identified shapes are selected as the one or more image elements to be extracted. The image data describing the one or more image elements is then stored temporarily in memory, for example, in RAM 108.

The identification of the one or more image elements may be facilitated if the type of object is known. For example, the first image includes a person or group of two or more persons as the subject, this information may be used in the identification process to more quickly and more accurately identify the person(s) in the image. When the type of object is a person, shapes, curves and other characteristics typical of a person, such as facial characteristics, are identified.

The type of object may be a parameter or setting which is configurable by the user. A default type of object (e.g., person) may be provided. The type of object setting may be set in 304 when the composite mode of the image capture assembly 200 is activated, for example, in response to a prompt to set the type of object. Alternatively, the type of object may be set before the composite mode of the image capture assembly 200 is activated. Alternatively, the type of object may be set after the composite mode of the image capture assembly 200 but before the one or more image elements are identified and extracted from the first image, for example, in response to a prompt to set the type of object.

A user interface to set the type of object may be displayed at the relevant time. Any suitable type of user interface may be used. The user interface allows a user to select the type of object from a number of predefined types. Each of the predefined types has predetermined criteria (such as known shapes or profiles of known shapes) associated with it. A default type of object (e.g., person) may be selected in the number of predefined types to facilitate setting the type of object. For example, a dropdown list of one or more predefined types of objects may be displayed, with the default type of object (e.g., person) selected in the dropdown list.

While the identification and extraction of image elements in the first image has been described as occurring in a particular order, it will be appreciated that the identification and extraction of image elements in the first image may be performed at a different time in the method, for example, immediately after the first image is captured, When the identification and extraction of image elements in the first image is performed at a different time, the modifying may be performed on the extracted image elements rather than the whole first image.

At 324, the electronic device 100 combines the extracted image elements and the second image to create a composite image. The electronic device 100 may utilize the GPS and orientation information to determine how to combine the extracted image elements and the second image. As well, the electronic device 100 may compare the first image and the second image for common image elements (i.e. background elements that are common to both images) to determine how to align the extracted image elements and the second image, how to combine the extracted image elements and the second image, and/or how to position the extracted image elements of the first image within the second image. For example, the extracted image elements of the first image may be location at the same position as the first image relative to the background. The electronic device 100 determines the common background elements of the first image and the second image, and positions the extracted image elements in the second image in the same position relative to the background as in the first image.

In another embodiment, the electronic device 100 may, by default, centre the extracted image elements within the second image. In another embodiment, the electronic device 100 may analyse the second image to determine a location of a primary object of the image (e.g., background) is located. For example, if the background includes the Eiffel. Tower located on the left side of the second image, the electronic device 100 may place the extracted portion on the right side of the second image, so that the main object of the background is visible and not obstructed by the placement of the extracted image elements. Additionally, the processor 102 or image processor 202 may utilize known image processing techniques, such as feathering, to blend the perimeter of the extracted portion with the background of the second image. Once the processor 102 or image processor 202 has combined the extracted image elements with the second image, the resulting composite image is stored in persistent memory.

The electronic device 100 may, in some embodiments, analyze the first image to determine whether one or more objects (e.g., the subject of the first image) were detected at a location less than a first threshold distance of the front camera 250 when the first image was captured. The second image is analyzed to determine whether one or more objects (e.g., the subject of the second image) were detected at a location greater than a second threshold distance of the rear camera 260. If one or more objects were not detected at a location less than the first threshold distance of the front camera 250 when the first image was captured, or one or more objects were not detected at a location greater than the second threshold distance of the rear camera 260, the method 300 ends. These checks may be performed at any time after the first and second images were captured and before the combining; however, the checks are typically performed immediately after the first image and second image were captured, respectively. This avoids unnecessary further processing when one or more of the captured images is not suitable for combination.

The electronic device 100 may initially position the extracted portion onto the second image, and store the combined image temporarily in memory, for example, in RAM 108. The electronic device 100 may further display on display 112 the composite image. The composite image may be modified, for example, by the user. The extracted image elements in the composite image, for example, may be re-positioned, re-sized or re-adjusted for perspective using, for example, touch inputs on the display 112 before finalizing and storing the composite image in persistent memory.

In an alternative embodiment, the extracting in 320 may be omitted from the composition method 300. In this embodiment, the GPS location information and orientation information are used to align the first image with the second image. As well, the electronic device 100 may compare the common image elements of the first image and the second image (i.e. background) to align the two images. Additionally, the proximity information may be utilized to reduce the size of the entire first image, prior to, or after, the first image is aligned with the second image. The first image provides an overlay, which is overlayed over the second image, and the two images are combined together with blending (e.g., blending of the pixels) of the first image and the second image where the two images meet.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar computer readable medium including program instructions stored thereon for performing the methods described herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description.

The invention claimed is:

1. A method for composite image creation on a portable electronic device, the method comprising:
storing a first image captured by a first image sensor of the portable electronic device, the first image being associated with first image data providing information about one or more conditions under which the first image was captured;
storing a second image captured by a second image sensor of the portable electronic device, the second image being associated with second image data providing information about one or more conditions under which the second image was captured;
determining whether there is a variance between the first and the second image data, and when there is a variance modifying the first image to match the one or more conditions under which the second image was captured;
extracting one or more image elements from at least one of the first image and the modified first image; and
combining the one or more extracted image elements with the second image to generate a composite image.

2. The method of claim 1, wherein the first and the second image data include one or more of a location, orientation or proximity of the portable electronic device when the respective first image and the second image were captured.

3. The method of claim 1, wherein the extracting includes:
analyzing at least one of the first image and the modified first image to determine the one or more image elements;
generating a selection of the one or more determined image elements; and
storing the one or more selected image elements.

4. The method of claim 3, wherein the analyzing comprises determining the one or more image elements in accordance with a type of object in at least one of the first image and the modified first image.

5. The method of claim 4, wherein the type of the object is a person.

6. The method of claim 1, wherein the combining includes:
positioning the one or more extracted image elements of the first image within the second image based on a comparison of one or more common image elements of the first image and the second image.

7. The method of claim 1, wherein the combining includes:
blending a perimeter of the one or more extracted image elements with the second image.

8. The method of claim 1, wherein the modifying includes:
modifying one or more of a size and a perspective of the first image based on the variance between the first and the second image data.

9. The method of claim 8, wherein modifying first image includes reducing the size of the first image.

10. The method of claim 1, wherein the storing of the first image and the second image includes:
displaying real-time images captured by the first and second image sensors;
storing the real-time images in a buffer memory.

11. The method of claim 1, further comprising storing the combined image in persistent memory.

12. The method of claim 1, wherein the first image sensor and second image sensor are separate image sensors.

13. The method of claim 12, wherein the first image sensor is associated with a front camera located on a front side of a housing and which includes the first image sensor, and the second image sensor is associated with a rear camera located on a rear side of the housing opposite to the front side and which includes the second image sensor.

14. An electronic device, comprising:
a processor;
a first image sensor coupled to the processor;
a second image sensor coupled to the processor;
the processor configured to:
store a first image captured by the first image sensor, the first image being associated with first image data providing information about one or more conditions under which the first image was captured;
store a second image captured by the second image sensor, the second image being associated with second image data providing information about one or more conditions under which the second image was captured;
determine whether there is a variance between the first and the second image data, and when there is a variance modify the first image to match the one or more conditions under which the second image was captured:
extract one or more image elements from at least one of the first image and the modified first image; and
combine the one or more extracted image elements with the second image to generate a composite image.

15. The electronic device of claim 14, wherein the first and the second image data include one or more of a location, orientation or proximity of the electronic device when the respective first image and the second image were captured.

16. The electronic device of claim 14, wherein the extracting includes: analyzing at least one of the first image and the modified first image to determine the one or more image elements, generating a selection of the one or more determined image elements, and storing the one or more selected image elements.

17. The electronic device of claim 16, wherein the analyzing comprises determining the one or more image elements in accordance with a type of object in at least one of the first image and the modified first image.

18. The electronic device of claim 17, wherein the type of the object is a person.

19. The electronic device of claim 14, wherein the first image sensor and second image sensor are separate image sensors.

20. The electronic device of claim 19, further comprising:
a housing;
a front camera located on a front side of the housing and which includes the first image sensor; and
a rear camera located on a rear side of the housing opposite to the front side and which includes the second image sensor.

* * * * *

UNITED STATES PATENT AND TRADEMARK OFFICE
CERTIFICATE OF CORRECTION

PATENT NO. : 8,830,356 B2  
APPLICATION NO. : 13/477656  
DATED : September 9, 2014  
INVENTOR(S) : Vadim Balannik et al.

Page 1 of 1

It is certified that error appears in the above-identified patent and that said Letters Patent is hereby corrected as shown below:

IN THE CLAIMS:
Claim 14, column 14, lines 33-34, delete "captured:" and insert --captured;--.

Signed and Sealed this
Thirtieth Day of December, 2014

Michelle K. Lee
*Deputy Director of the United States Patent and Trademark Office*